United States Patent [19]

Fuchs et al.

[11] Patent Number: 5,293,915

[45] Date of Patent: Mar. 15, 1994

[54] MANUAL MILLING MACHINE

[75] Inventors: Rudolf Fuchs, Neuhausen; Cornelius Boeck, Leinfelden-Echterdingen, both of Fed. Rep. of Germany; Roberts: Bruce; David M. Martinez, both of New Bern, N.C.

[73] Assignee: Robert Bosch GmbH, Stuttgart, Fed. Rep. of Germany

[21] Appl. No.: 974,802

[22] Filed: Nov. 12, 1992

[30] Foreign Application Priority Data

Nov. 29, 1991 [DE] Fed. Rep. of Germany ....... 4139344

[51] Int. Cl.$^5$ .......................... B27M 1/00; B27C 5/00
[52] U.S. Cl. .......................... 144/134 D; 144/136 C; 144/144 R; 144/371
[58] Field of Search ............... 409/125, 130, 175, 182; 144/1 F, 134 D, 136 C, 137, 144 R, 371

[56] References Cited

U.S. PATENT DOCUMENTS 3,332,462  7/1967  Williams ...................... 144/144 R Primary Examiner—W. Donald Bray
Attorney, Agent, or Firm—Michael J. Striker

[57] ABSTRACT

A manual milling machine comprises a motor housing, a foot plate adapted to be placed on a workpiece and having a central opening, a milling tool extending through the central opening, a tool receptacle provided on the lower side of the motor housing, a guiding sleeve which surrounds the milling tool and extends in the mounted condition beyond the foot plate, and an assembly for connecting the guiding sleeve with the foot plate. The connecting assembly includes a plug connection provided on the guiding sleeve and a bayonet lock connecting the plug connection with the foot plate.

14 Claims, 2 Drawing Sheets

MANUAL MILLING MACHINE

BACKGROUND OF THE INVENTION

The present invention relates to a manual milling machine.

More particularly, it relates to a manual milling machine which has a motor housing, a foot plate adapted to be placed on a workpiece and having a center opening for passage of a milling tool, a tool receptacle for receiving the milling tool at the lower side of the motor housing and a removable guiding sleeve surrounding the milling tool and extending beyond the foot plate.

Manual milling machines of the above mentioned general type are known in the art. One of such machines is disclosed for example in the U.S. Pat. No. 1,745,780. The manual milling machine is provided with the above mentioned guiding sleeve which surrounds the milling tool, so that the manual milling machine can perform milling along a template placed on the workpiece. The guiding sleeve disclosed in this reference is mounted on the lower side of the motor housing by connecting pins. The mounting and dismounting sleeve is difficult due to the bad accessability of the pins. Moreover, there is a danger that the connecting pins can be lost with not used guiding sleeves.

SUMMARY OF THE INVENTION

Accordingly, it is an object of the present invention to provide a manual milling machine which avoids the disadvantages of the prior art.

In keeping with these objects and with others which will become apparent hereinafter, one feature of the present invention resides, briefly stated, in a manual milling machine of the above mentioned general type in which the guiding sleeve is connected with the foot plate by a plug connection with a bayonet lock.

When the manual milling machine is designed in accordance with the present invention, it has the advantage that the guiding sleeve which by the friction on a template is urged for rotation can be connected with the motor housing and dismounted in a simple and reliable manner.

The bayonet lock is designed so that the guiding sleeve during the longitudinal guidance on a template does not rotate and cannot be lost. This is obtained when the rotatable part of the bayonet lock is integrated in the foot plate as a clamping ring.

In accordance with another advantageous feature of the present invention, the clamping ring is driven by a spring to its end position fixing the guiding sleeve.

A firm holding of the guiding sleeve is obtained when it has special inclined clamping surfaces which abut between the clamping cams on the clamping ring and the stops on the foot plate.

The guiding sleeve is secured against rotation by notches and projections on the stops of the foot plate.

Advantageously, the clamping ring is provided with a handle for turning against the pulling direction of the spring, which extends laterally beyond the opening from the foot plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
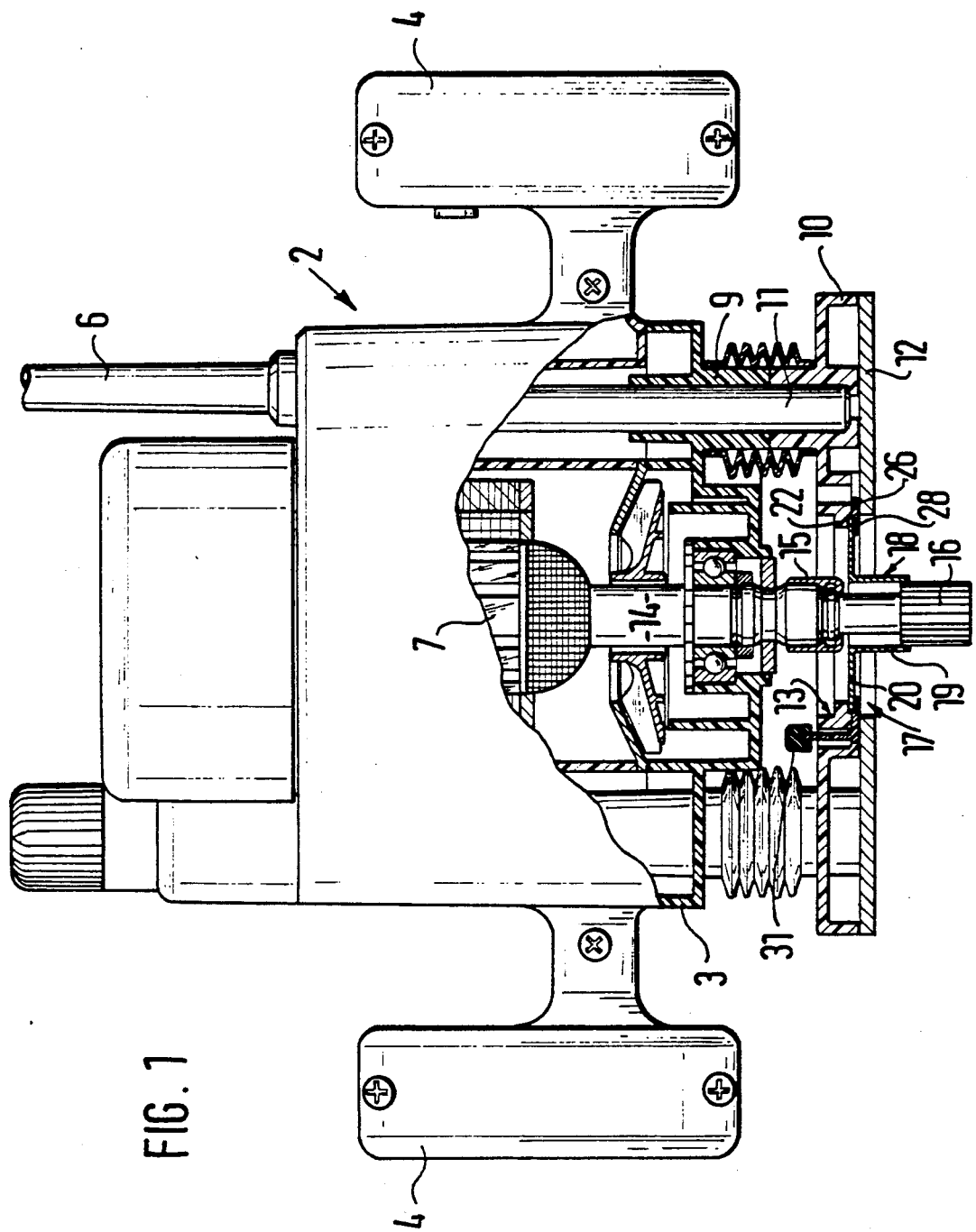
FIG. 1 is a view showing a longitudinal section of a manual milling machine.

A manual milling machine which is formed as a router is identified with reference numeral 2. It has a multi-part motor housing 3 composed of aluminum and/or synthetic plastic material. Two handles 4 are provided on the housing 3, and an electrical switch 5 is accommodated in one of the handles. The switch 5 is electrically connected with the network connecting conductors 6 and with a drive motor 7.

The housing 3 has a vertically oriented guiding pipes 9 which are guided on two vertical guiding columns 11 extending upwardly from a foot plate 10. The foot plate 10 is composed of aluminum and provided with a synthetic plastic bottom 12 for protecting a workpiece to be machined. The foot plate 10 and the bottom 12 have a central opening 13 for passing a spindle 14 driven by the motor 7. The spindle 14 at its lower end is provided with a tool receptacle, especially formed as a clamping sleeve 15. A milling tool 16 is exchangeably held in the clamping sleeve. The motor housing 3 is displaceable along the column 11 relative to the foot plate 3, so that the tool 16 inserted in the clamping sleeve 15 engages more or less into the workpiece to be machined.

Figure 2:
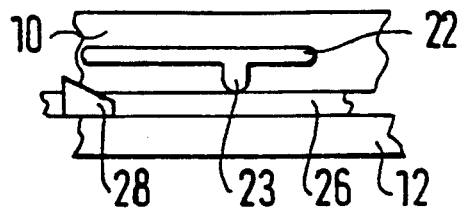
FIG. 2 is a view showing a clamping ring with a guiding sleeve of the inventive manual milling machine, as seen in direction II in FIG. 3.
Figure 4:
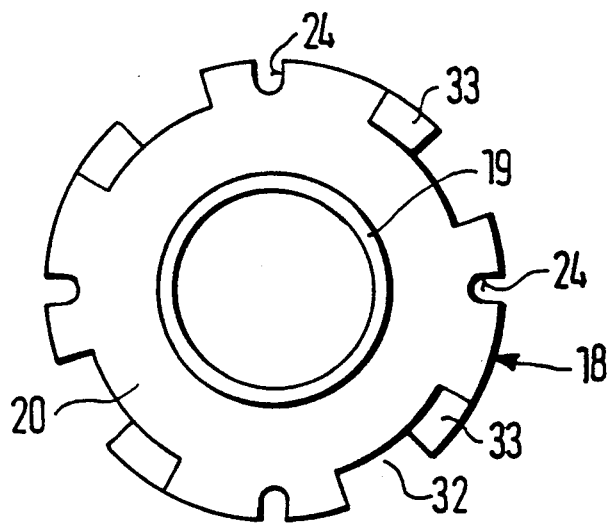
FIGS. 4 and 5 are views showing the guiding sleeve of the inventive manual milling machine.

A plug connection 17 for receiving a guiding sleeve 18 is provided in the opening 13. The plug guiding sleeve 18 includes a tubular guiding part 19 which surrounds the tool 16, and a radially extending collar 20 formed on the guiding part 19. The guiding part 19 is exchangeable and, depending on the tool to be used, can have a different diameter. The collar 20 abuts with its outer edge against stops 22 of the foot plate 10 which extend into the opening 13. In the shown embodiment four such stops 22 are provided. A projection 23 which extends in the axial direction of the opening 13 is arranged on the stop 22 and engages in an associated notch 24 on the edge of the guiding sleeve 18, for preventing a turning of the guiding sleeve 18 relative to the foot plate 10 as shown in FIGS. 2 and 4.

The guiding sleeve 18 is held in firm abutment against the stops 22 by a turnable clamping ring 26. The clamping ring 26 is located between the foot plate 10 and the bottom 12. The clamping ring is forced to its locking end position by a pulling spring 27 which is held on the foot plate, and in particular is suspended in a rib of the foot plate. Four clamping cams 28 extend radially inwardly from the clamping ring 26. They are inclined to the stops 22 and hold the guiding sleeve 18. The clamping ring 26 has moreover two elongated openings 29 extending in the peripheral direction. Guiding pins 30 mounted on the foot plate 10 engage in the elongated openings 29. A handle 31 extends through a bent slot in the foot plate 10 upwardly in the axial direction.

Figure 5:
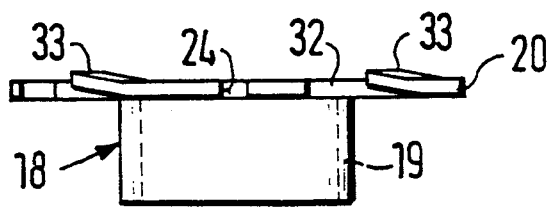

Recesses 32 for passage of the clamping cams 28 are provided in the guiding sleeve 18 in its collar 20 near the notches 24 for preventing the rotation. Clamping surfaces 33 are connected with the recesses 32 and are slightly upwardly bent from the plane of the collar 20 as shown in FIG. 5. Thereby the clamping surfaces 33 are inclined to the rotary plane of the clamping ring 26, as the clamping cams 28.

Figure 3:
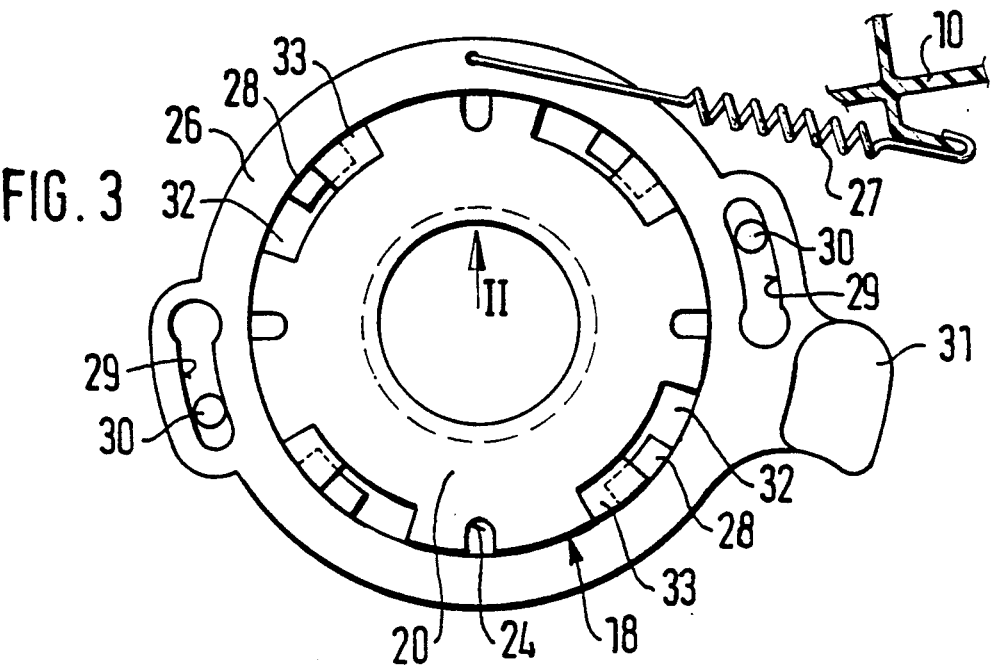
FIG. 3 is a view showing a section through a plug connection of the inventive manual milling machine.

The stops 22, the clamping ring 26 and the collar 20 of the guiding sleeve 18 together form a bayonet lock. The mounting of the guiding sleeve 18 is performed by simple insertion of the sleeve 18 into the opening 13 with the unlocked clamping ring 26 which is for example as shown in FIG. 2 is turned by 40° to the left. Thereby the collar 20 with its recesses 32 is pushed over the laterally offset clamping cams 28. When the guiding sleeve 18 abuts against the stops 22 and the projections 23 engage in the notches 24, the handle 31 is released. Then the clamping ring 26 is turned under the spring pressure back to its locking position shown in FIG. 3 and clamps the inclined clamping surface 33 with its inclined clamping cams 28 against the stops 22. The inclinations serve for a continuous, reliable fixation of the guiding sleeve 18. The inclinations are designed so that the clamping ring 26 with the inserted guiding sleeve 18 is moved back not completely to its end position shown in FIG. 2, as can be seen from the position of the pins 30 in the elongated openings 29. Thereby during operation along the template, a stable guidance is insured. The guiding sleeve 18 is not turned either during insertion or later during the use of the mill 2 and therefore cannot be automatically released.

For dismounting or for exchanging the guiding sleeve 18, only the clamping ring 26 is turned on its handle 31 by approximately 40° and the sleeve 18 can be axially withdrawn difficulties. The milling machine can be of course used without the guiding sleeve as well.

It will be understood that each of the elements described above, or two or more together, may also find a useful application in other types of constructions differing from the types described above.

While the invention has been illustrated and described as embodied in a manual milling machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A manual milling machine, comprising a motor housing; a foot plate adapted to be placed on a workpiece and having a central opening; a milling tool extending through said central opening; a tool receptacle provided on the lower side of said motor housing; a guiding sleeve which surrounds said milling tool and extends in the mounted condition beyond said foot plate; and means for connecting said guiding sleeve with said foot plate, said connecting means including a plug connection provided on said guiding sleeve and a bayonet lock connecting said plug connection with said foot plate.

2. A manual milling machine as defined in claim 1, wherein said bayonet lock includes a clamping ring provided with a plurality of clamping cams and rotatable over a limited angle, said clamping ring being connected with said foot plate.

3. A manual milling machine as defined in claim 2; and further comprising a spring urging said clamping ring to a locking end position.

4. A manual milling machine as defined in claim 2, wherein said bayonet lock has a plurality of stops provided on said foot plate in the region of said openings, said stops cooperating with said clamping cams of said clamping ring and acting in an axial direction.

5. A manual milling machine as defined in claim 4, wherein said guiding sleeve has clamping surfaces insertable between said clamping cams and said stops.

6. A manual milling machine as defined in claim 2, wherein said guiding sleeve has recesses for passing said clamping cams.

7. A manual milling machine as defined in claim 2, wherein said clamping cams are inclined.

8. A manual milling machine as defined in claim 4, wherein said stops are inclined.

9. A manual milling machine as defined in claim 5, wherein said clamping surfaces are inclined.

10. A manual milling machine as defined in claim 4, wherein said stops and said guiding sleeve have an edge and are provided on said edge with complementary elements preventing a turning in a peripheral direction.

11. A manual milling machine as defined in claim 10, wherein said complementary elements are formed as radial projections and recesses.

12. A manual milling machine as defined in claim 10, wherein said complementary elements are formed as axial projections and recesses.

13. A manual milling machine as defined in claim 3, wherein said clamping ring has a handle for turning against a pulling direction of said spring.

14. A manual milling machine as defined in claim 13, wherein said handle extends laterally through said opening of said foot plate.

* * * * *